Aug. 1, 1944. W. D. YERRICK ET AL 2,355,024
REACTOR
Filed Jan. 8, 1942 10 Sheets-Sheet 6
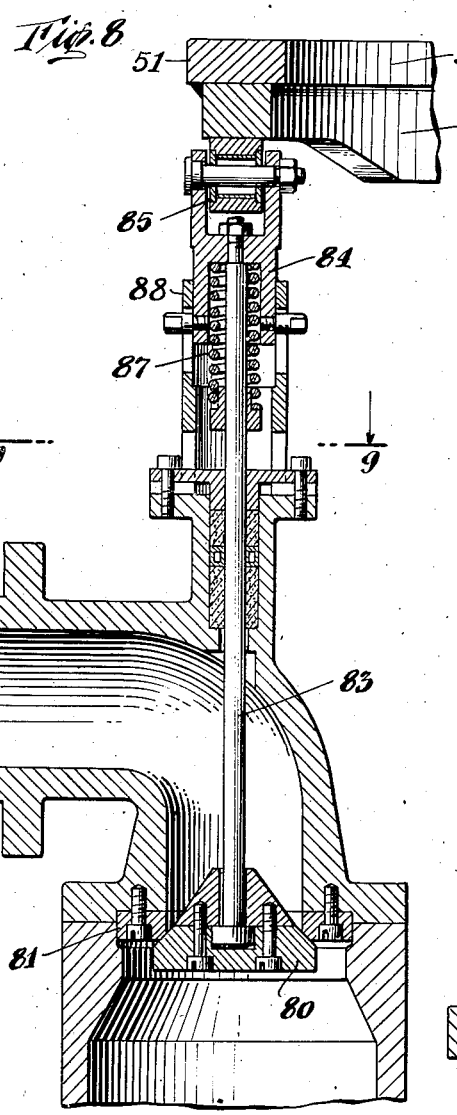
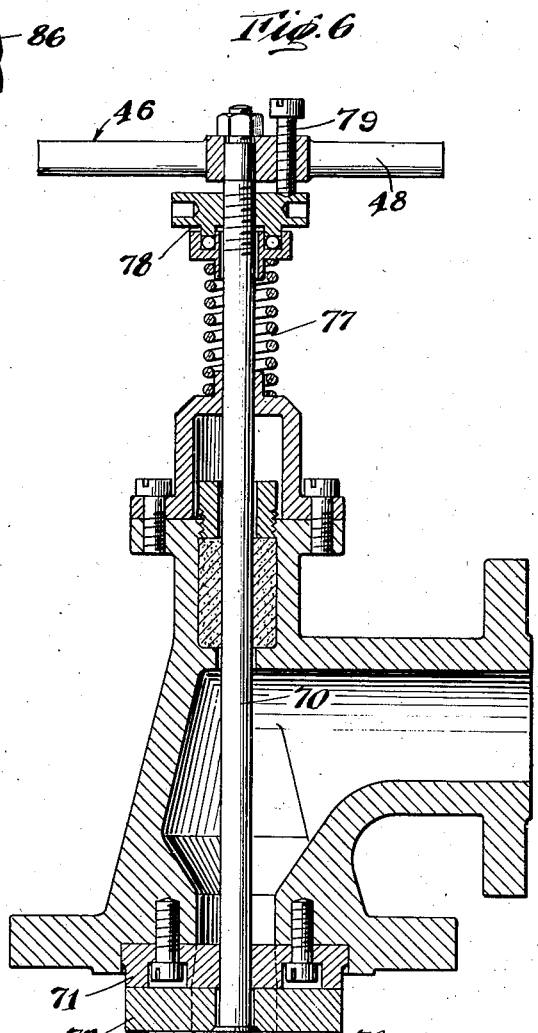
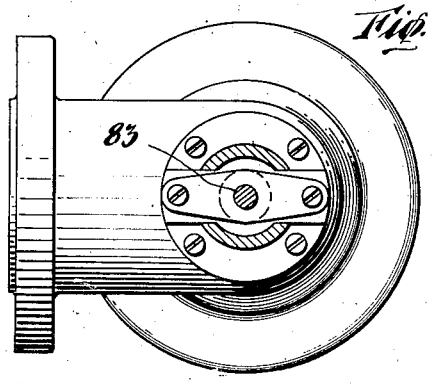
WILLIAM D. YERRICK
SVEN HOLM
ARTHUR JENSEN
INVENTORS
BY
ATTORNEY

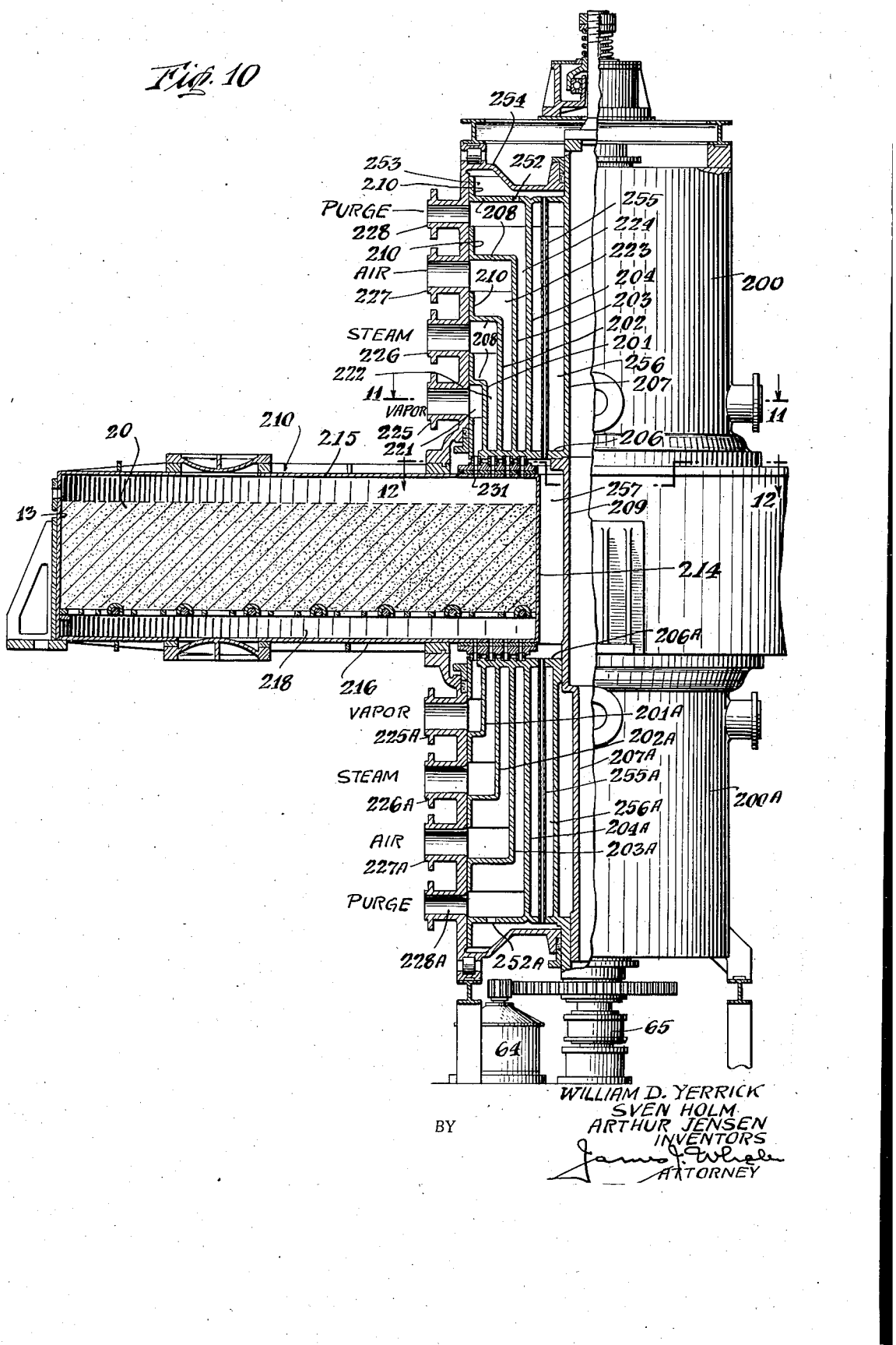

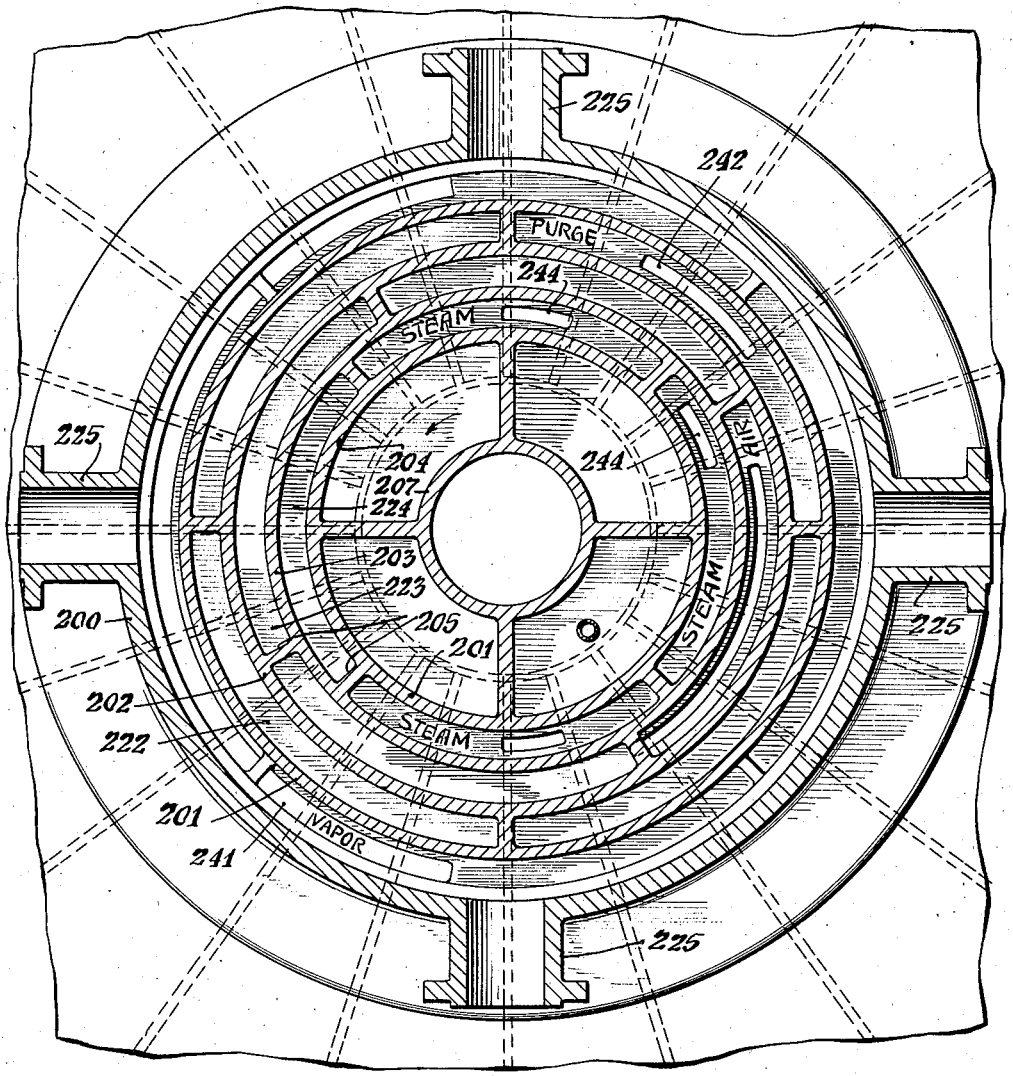

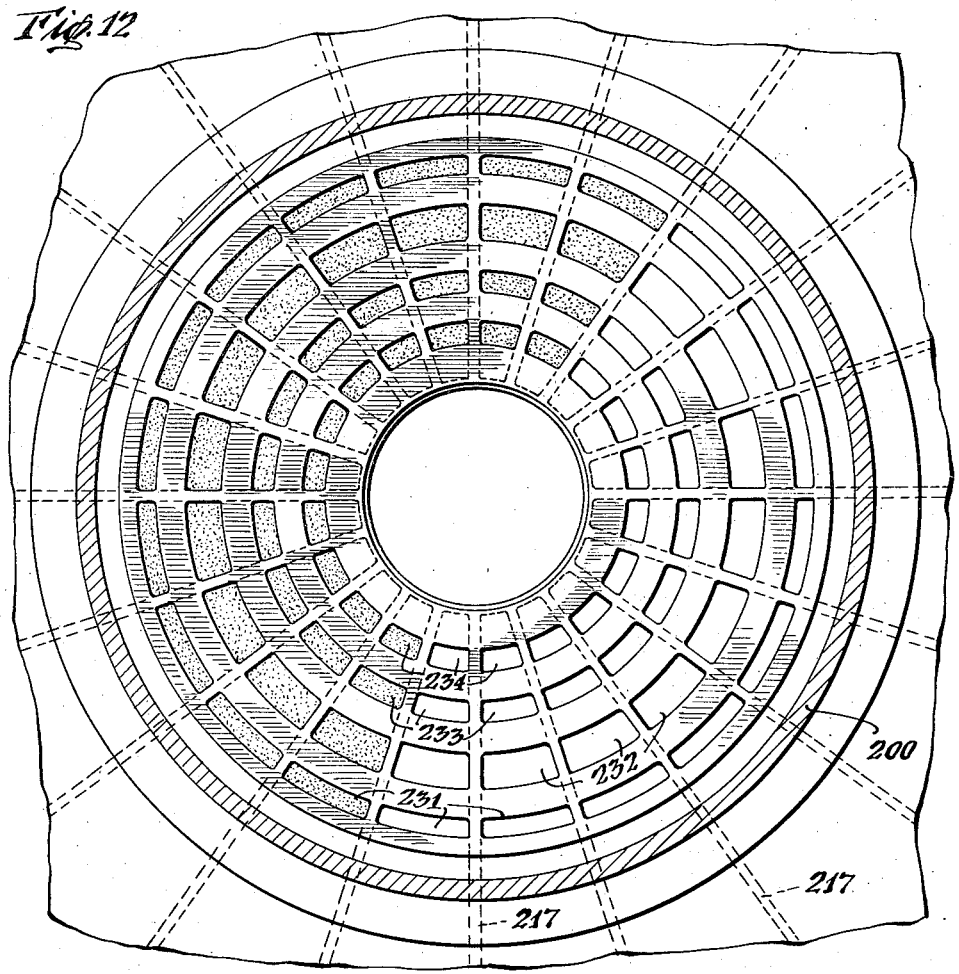
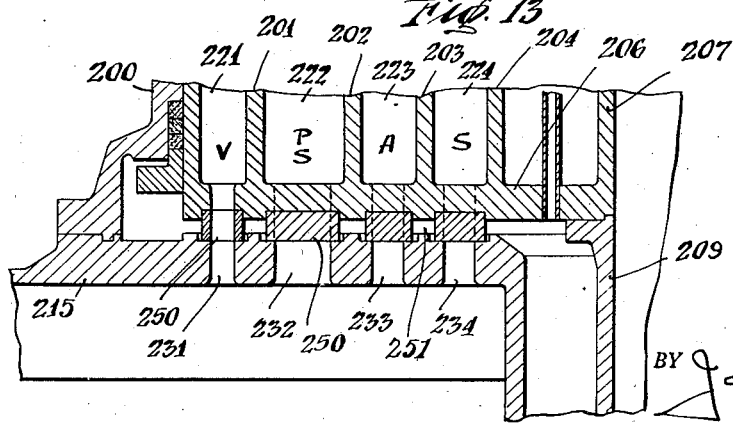

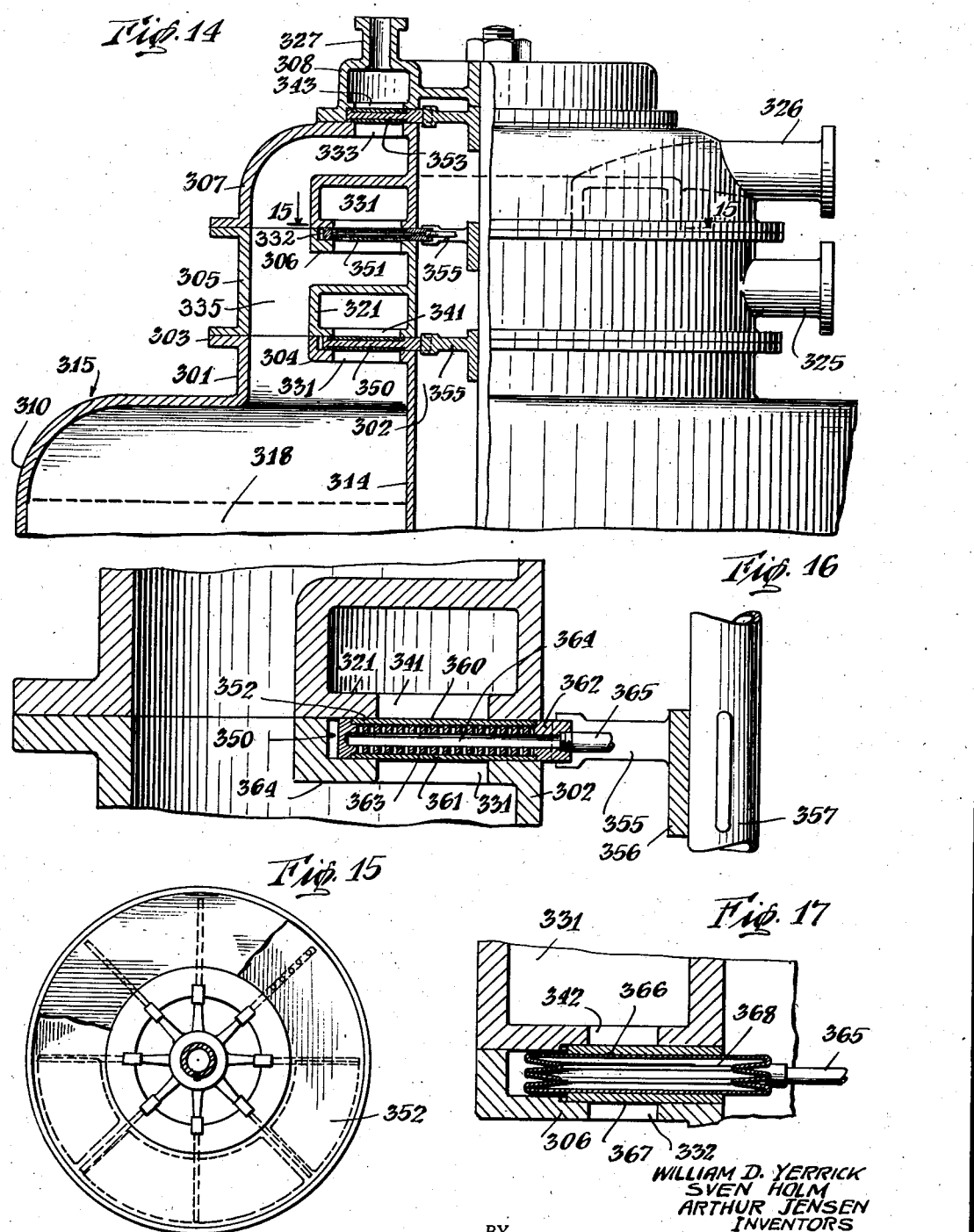

Patented Aug. 1, 1944

2,355,024

UNITED STATES PATENT OFFICE 2,355,024

REACTOR

William D. Yerrick, Sven Holm, and Arthur Jensen, Wellsville, N. Y., assignors to The Air Preheater Corporation, New York, N. Y.

Application January 8, 1942, Serial No. 425,988

10 Claims. (Cl. 23—288)

The present invention relates to apparatus for carrying out chemical reactions such, for example, as the cracking of gasoline by passing vaporized hydrocarbons over a catalytic mass.

In practicing one method of cracking petroleum stocks hydrocarbons are vaporized and passed through a reaction zone to contact a granular catalytic mass, such, for example, as fuller's earth. Lower-boiling hydrocarbons and "carbon" result from cracking. These hydrocarbons and some of the carbon pass immediately out of the reaction zone but part of the carbon adheres to the catalyst decreasing its activity. When the economic limit of catalyst activity has been reached, the stream of hydrocarbon vapors to be cracked is diverted to another reaction zone containing a reactivated catalyst mass, and the fouled mass is subjected to regeneration. This is usually accomplished by first passing steam through the mass to remove traces of vapor and then passing an oxidizing gas through the catalyst so as to burn off the carbon. After reactivation of the catalyst it may again be contacted by steam to purge it of products of combustion whereupon vapors to be cracked are again passed through a reaction zone containing the reactivated catalyst mass and the operation thus proceeds.

The economic limit of catalyst activity may be reached in a very short time, even in a few seconds, and, in certain catalytic cracking operations, the entire cycle time for cracking and regeneration may be less than a minute. This has necessitated the development of elaborate control mechanisms for automatically bringing about diversion of the stream of stock from a fouled catalytic mass to a regenerated one.

In accordance with the present invention the various fluids utilized in the reaction are passed through a plurality of stationary chambers each containing reactant material, such as a catalyst, so that the latter is successively contacted by each fluid. The invention is particularly directed to providing simple yet rugged apparatus for automatically directing the fluids from one chamber to another so that the process may be continuously carried out.

In the drawings:

Figure 6 is an enlarged sectional view of a valve suitable for use in apparatus illustrated in Fig. 1.

Figure 7 is a bottom end view of the valve disc of Fig. 6.

Figure 8 is an enlarged sectional view of one of the valves illustrated in Fig. 3.

Figure 9 is a view on the line 9—9 in Fig. 8.

Figure 10 is a sectional elevational view of part of another form of reactor.

Figures 11 and 12 are sectional views on the lines 11—11 and 12—12 in Figure 10.

Figure 13 is an enlarged sectional view of a portion of the apparatus shown in Fig. 10.

Figure 14 is a partial sectional view through the upper portion of a reactor provided with another type of valve mechanism;

Figure 15 is a sectional view on the line 15—15 in Figure 14 showing the operating means for the valve mechanism;

Figure 16 is an enlarged sectional view showing the detailed construction of a preferred form of valve; and Figure 17 is a view similar to Figure 16 of another type of valve.

Figure 1:
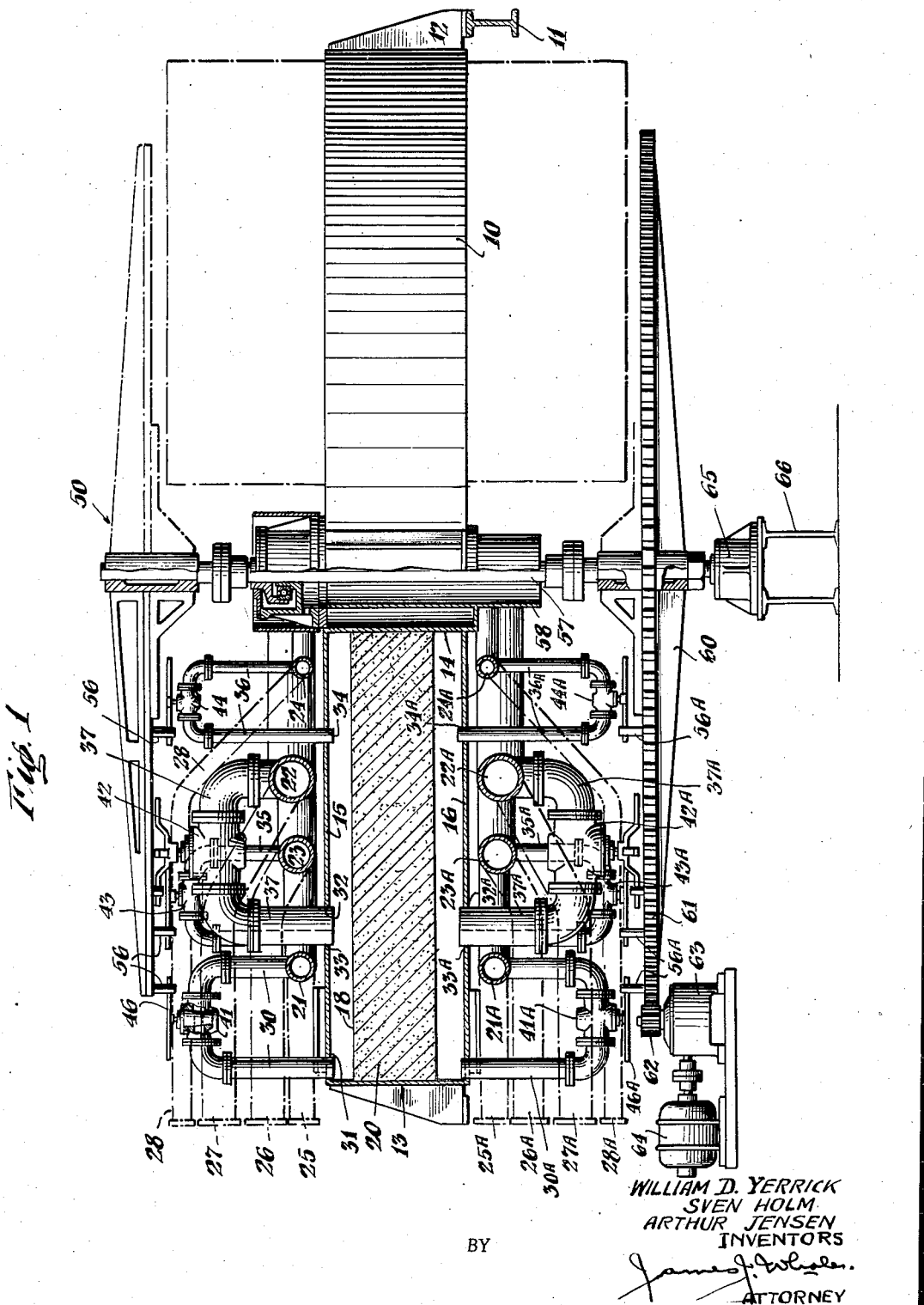
Figure 1 is an elevational view, partly in section, of a reactor embodying the present invention.
Figure 2:
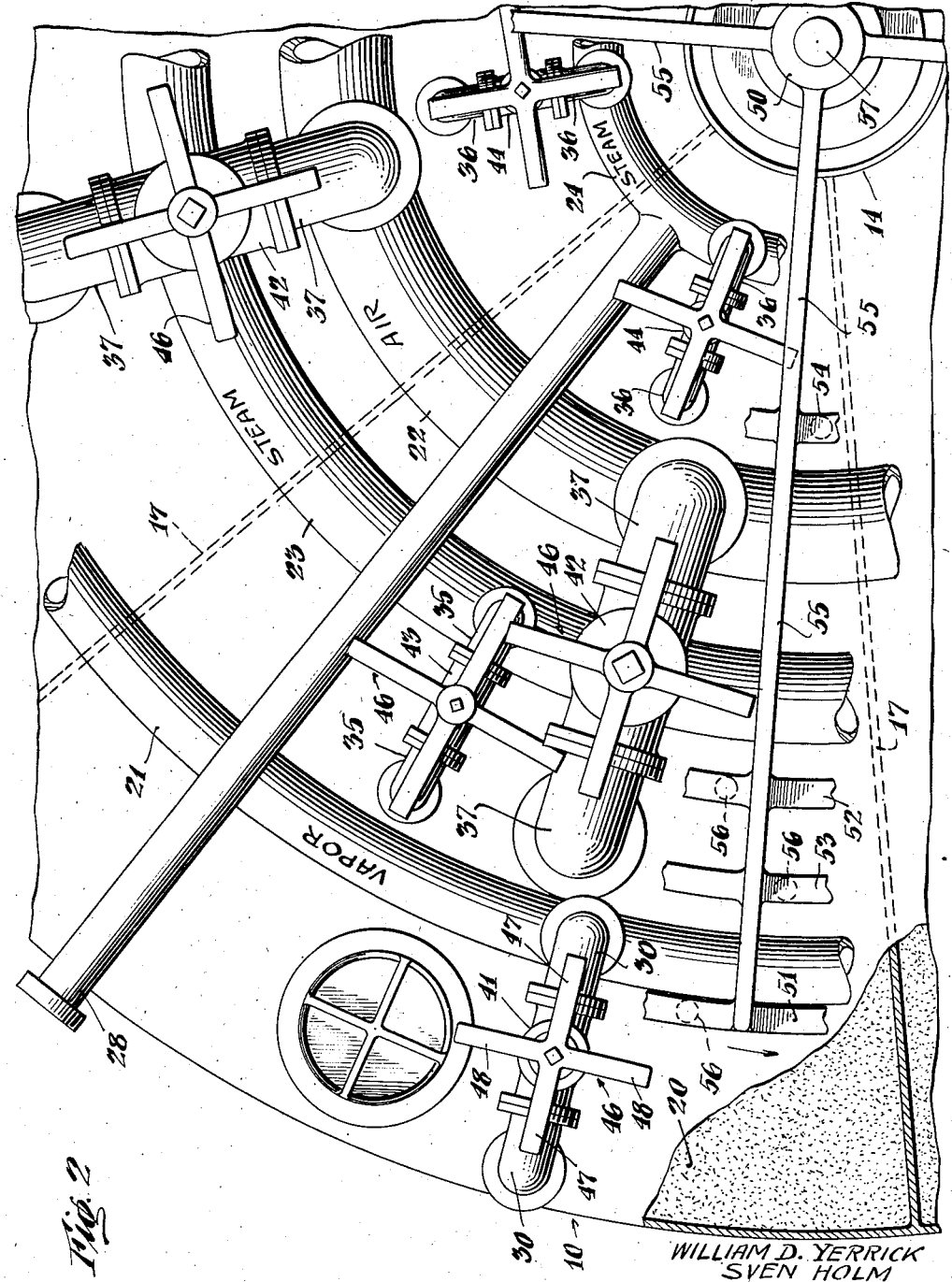
Figure 2 is a partial plan view of the apparatus shown in Figure 1.

Referring to Figures 1 and 2, the numeral 10 designates a closed stationary vessel supported on beams 11 by brackets 12. The vessel 10 is annular, having outer and inner circular walls 13, 14 joined to end walls 15, 16. It is divided interiorly by radially extending partitions 17 into a plurality of sector-shaped compartments or chambers 18 each containing a porous reactant material 20 which, when the apparatus is utilized for cracking hydrocarbon vapors, may be a granular catalytic mass, such as fuller's earth. The partitions 17 extend throughout the height of chambers 18 and are suitably connected to the end walls 15, 16 of vessel 10, as by welding, so that all the chambers are fluid tight. Mounted above the vessel 10 are a plurality of manifolds for supplying various fluids to the various chambers of the vessel. For example, the manifolds 21 and 22 may supply vapor and air respectively, and the manifolds 23 and 24 may supply steam as indicated by the legends in Fig. 2. In the form shown the manifolds are circular pipes disposed in concentric relation about the axis of the vessel 10 and receiving their fluid supply through lead pipes 25, 26, 27 and 28. The several manifolds have connections for supplying their fluids to each of the sector-shaped chambers 18 of the vessel 10, the manifold 21 being connected by piping 30 to ports 31 in the end wall 15 of vessel 10 above each chamber 18. The steam manifolds 23 and 24 are connected to the various chambers by piping 35 and 36 leading to the ports 33, 34 in the top wall of each chamber, while the air manifold 22 is connected by piping 37 to a port 32.

Interposed in each pipe connection between the various manifolds and each chamber of the vessel 10 is a rotary valve, which may be a plug valve as shown for the vapor valve 41 in Fig. 1. Each valve is operated by means of a cruciform operating member or star wheel 46 attached to its spindle, the valve being opened when an actuating member strikes and moves one arm 47 through 90° and closed when the following arm 48 is similarly moved. The operating members 46 for all valves controlling the supply of any particular fluid from the respective manifolds 21—24 to each chamber 18 of the vessel 10 are mounted in separate concentric circles about the center of the vessel so that the arms of the star wheels may be engaged and operated by a suitable device having elements travelling in concentric paths of movement about the axis of the vessel. In Figs. 1 and 2 this device is a reel 50 having radial arms 55 supporting a plurality of rings 51, 52, 53 and 54 carrying removable studs 56. Thus, the studs may be disposed in both radially and circumferentially spaced relation with respect to each other and consequently various valves may be operated sequentially or simultaneously as desired. The reel is secured to a shaft 57 which extends through a sleeve 58 in the center of vessel 10 and also carries a second reel 60 located beneath the vessel and provided with gear teeth 61 engaged by a pinion 62 which is part of a speed reducer 63 driven by a motor 64. Shaft 57 is supported at its lower end in a bearing 65 mounted on the beams 66.

Beneath the vessel 10 the arrangement of manifolds, valves and operating members therefor is duplicated, the parts where specially designated bearing the suffix "A" in addition to the reference character applied to corresponding elements on the inlet side of the vessel. Thus, fluids admitted through the various inlet ports 31—34 for a compartment contact the reactant material 20 and are discharged into offtake manifolds 21A, 22A, 23A and 24A as the outlet valves 41A, 42A, 43A and 44A are operated by reel 60 simultaneously with the related inlet valves 41—44.

Figures 6 and 7 show a rotary disk valve that may be utilized with the reactor of Figures 1 and 2, when the pipe elbows in the piping between the manifolds and chambers 18 are omitted. The valve stem 70 to which the star wheel 46 is attached extends through the center of stationary and movable valve disks 71, 72 and has a boss 73 at its lower end provided with a spherical surface loosely connecting it to the rotary disk 72. The disks 71 and 72 have a similar number of ports 74 with intervening imperforate sections (Figure 7) and when the lugs 75 at the end of stem 70 engage bosses 76 on the under side of the disk 72 the apertures therein may be alined with the apertures in the stationary disk 71 permitting fluid flow. The stationary valve spring 77 mounted on a bracket fastened to the valve body provides tension on the valve disk 72 holding it tight against the seat 71. The upper spring seat 78 fixed to spindle 70 is mounted with a ball bearing to prevent twisting of the spring during rotation of the valve and also when adjusting tension on the valve disk by the spring adjusting valve nut which is screwed on the stem and locked in place by the adjusting nut locking screw 79.

In carrying out a petroleum cracking process as described above studs 56, 56A carried by the outermost rings 51 of the reels open an inlet valve 41 and the corresponding outlet valve 41A permitting vapor to flow into and through the related chamber of the vessel 10. At this time inlet valves 42, 43 and 44 and the related outlet valves 42A, 43A, 44A for this chamber are closed so that the supply of air to the compartment from the manifold 22 and of steam from either manifold 23 or 24 is cut off. It will be understood that vapor may be supplied simultaneously to several of the chambers of the vessel 10, which chambers may be located immediately adjacent each other or spaced circumferentially of the vessel with intervening chambers receiving other fluids, such as steam, in a purging operation or air in a reactivating step. While vapor is being supplied to one chamber or series of chambers, the related inlet and outlet valves for one or more other chambers may be open to permit steam to be passed therethrough from the manifold 23. At the same time some of the chambers may receive air from the manifold 22 to reactivate the catalyst and still other chambers may receive steam from the manifold 24 to remove products of combustion.

After the valve 41 admitting vapor to the chamber has been open for a period of time sufficient to meet the conditions of the process that is being carried out or until the catalyst requires regeneration, the next following studs 56, 56A in the direction or rotation of the reels 50, 60 engage the arms 48 for the vapor valves 41, 41A and close them. The period of time that these valves remain opened is determined of course by the rate of rotation of the reel and the distance between the successive studs on the rings that first opened and then closed the valves. As the vapor valves 41, 41A for one compartment are closed, the vapor valves for one or more other compartments are opened so that the flow of vapor to and through the vessel is uninterrupted in order that the process may be continuous. Upon closing of the vapor valves the valves 43 for supplying purging steam from the manifold 23 are opened and subsequently closed after a suitable period of time by properly placed studs on the ring 53 of the reel. After discontinuance of the supply of steam from the manifold 23 the air valve 42 is opened and then closed by a stud on the reel ring 52 and finally studs on the innermost ring 54 open and close the valve 44 for supplying purging steam again, this time from the manifold 24.

Figure 3:
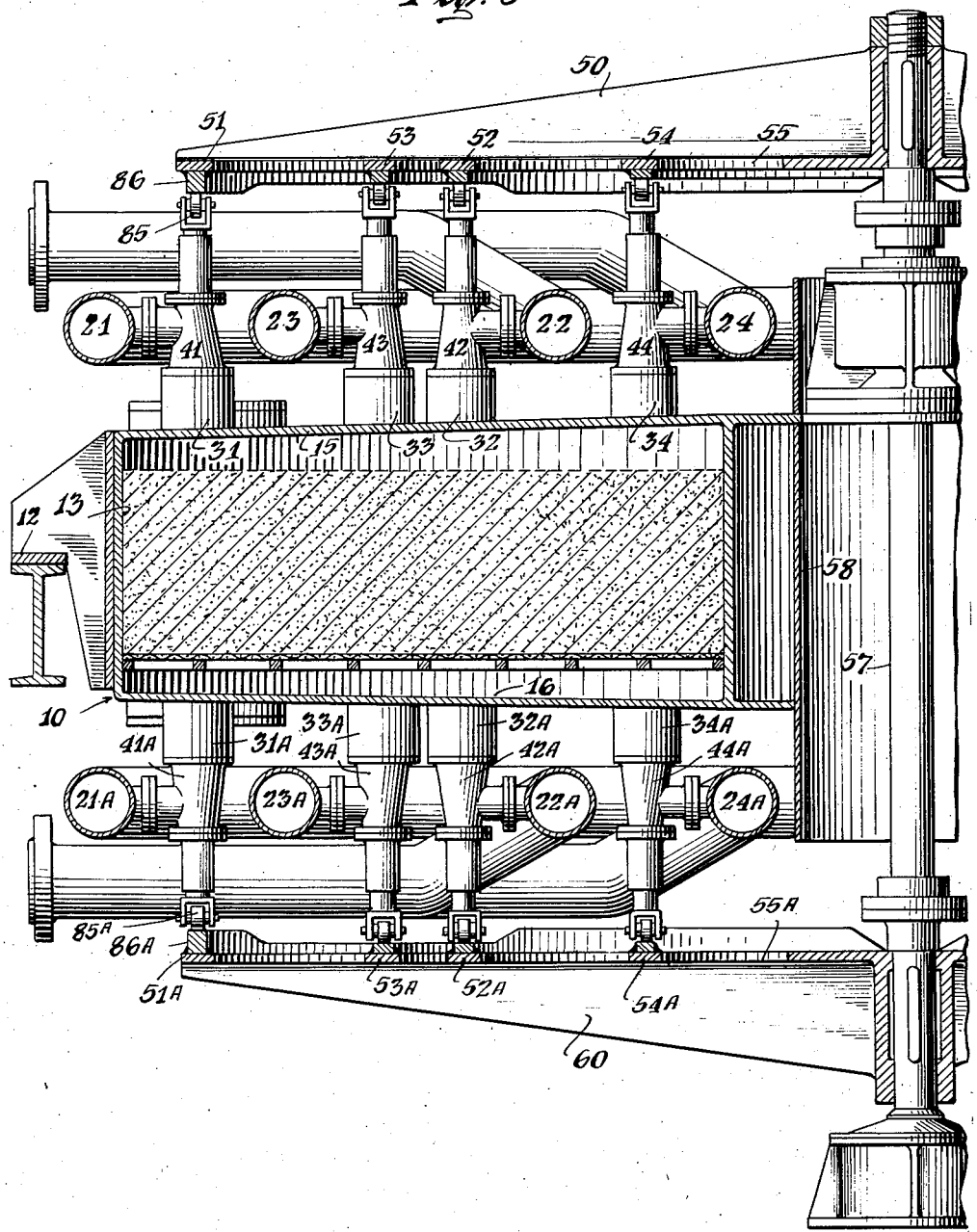
Figure 3 is a sectional elevational view of part of a reactor similar to that of Figures 1 and 2 but illustrates another form of valve operating mechanism.

The apparatus illustrated in Figure 3 is, in general, similar to that shown in Figures 1 and 2 but is equipped with poppet valves of the type shown in Figure 8 instead of rotary valves. The valve member 80 is held against the valve seat 81 by a spring 87 and its spindle 83 is fastened at its upper end to a slide 84 which carries a roller 85 engaged by a spring 87 against the contour of a cam ring 86 on a ring 51, etc., of the reel 50. The slide 84 is movably guided in a bracket 88 attached to the valve body and is held against rotation by nuts or lugs operating in slots in the bracket. To open these valves at the proper times the radially spaced concentric rings of the reels 50, 60 above and below the vessel 10 are provided with suitably contoured cams 86 so that the valves for the various fluids may be opened and closed in the desired sequence.

Figure 4:
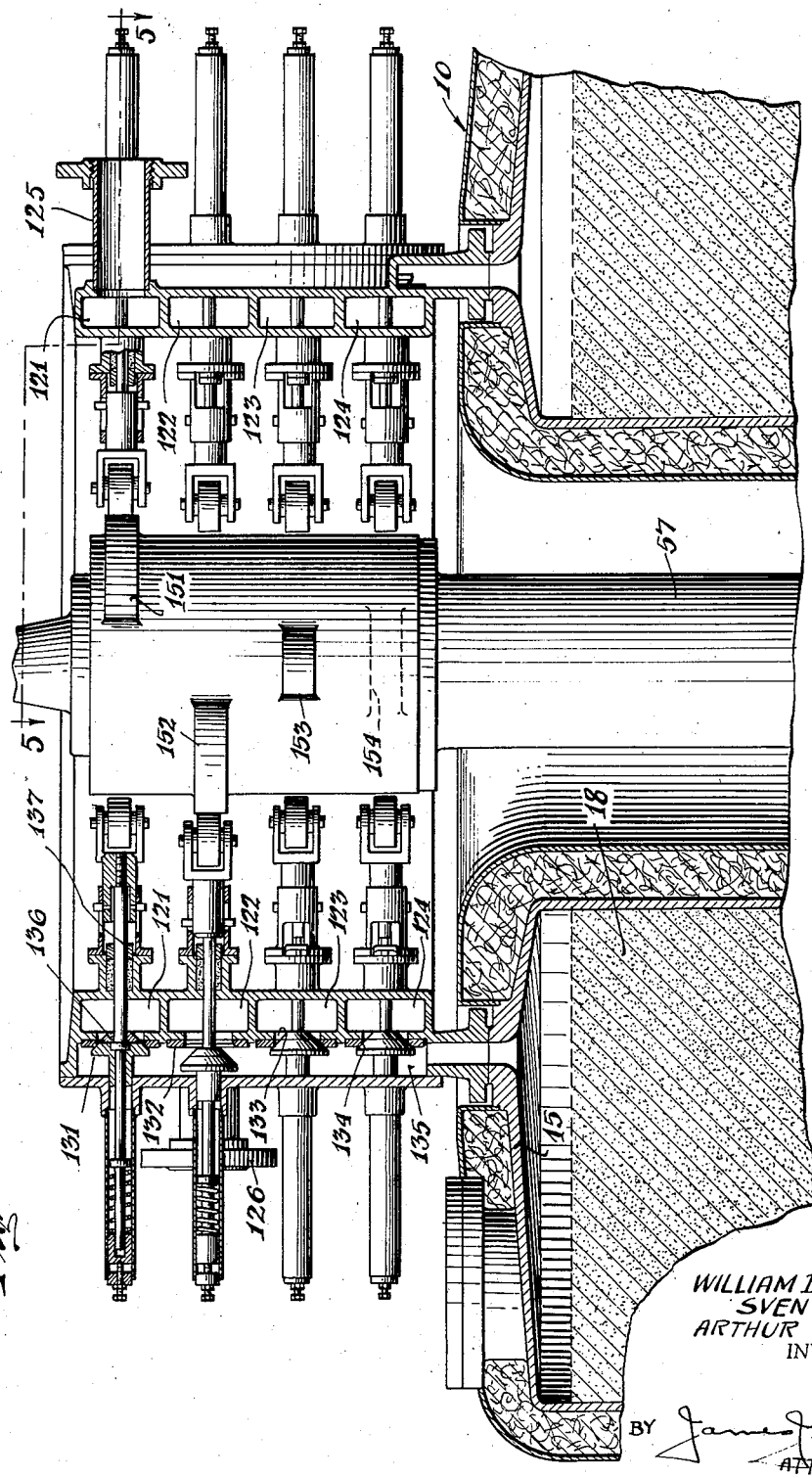
Figure 4 is a partly sectioned view on an enlarged scale of the upper part of a reactor similar to that illustrated in Fig. 1 but embodying another type of valve actuating mechanism.
Figure 5:
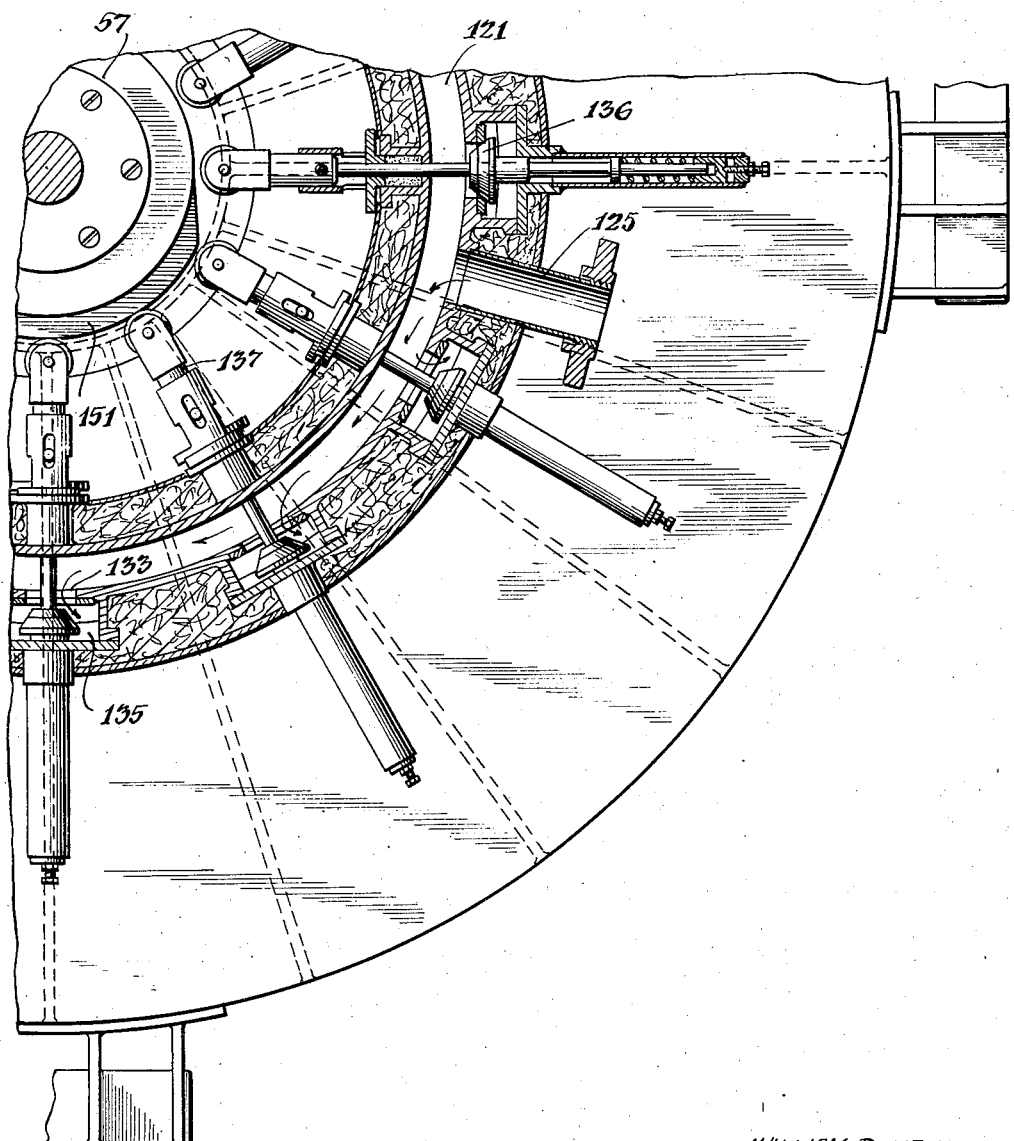
Figure 5 is a fragmentary sectional view on the line 5—5 in Figure 4.

In Figures 4 and 5 it will be noted that annular manifolds 121, 122, 123 and 124 for the various fluids are superimposed and discharge through the ports 131, 132, 133, 134 into a common passage 135 one of which leads to each chamber 18 of the vessel 10. The various ports are normally closed by spring pressed poppet valves 136 which have stems 137 extending completely through the manifold structure. The valves are arranged in four vertically spaced rows in each of which a number of valves are spaced circumferentially about the axis of the vessel so their stems project through the inner wall of the manifolds toward the vertical axis of the vessel. The rotary shaft 57 is provided above and below the ends of the vessel with a series of rotary cam members 151—154 engageable with the inner ends of the stems for the four sets of poppet valves so as to open and close them in the order and at the times desired.

In the reactor shown in Figures 10 to 13, hollow cylindrical housings 200, 200A are mounted above and below the central portion of the vessel 210. Each housing 200 is provided exteriorly with flanged pipe connections 225, 226, 227, 228 to which the conduits for supplying the various fluids may be connected. Near its central portion which lies beneath the housing 200 the top plate 215 of the vessel 210 is formed with a plurality of ports 231, 232, 233, 234 for various fluids. One port for each fluid is provided in the sections of the top plate 215, and bottom plate 216 also, that registers with each of the chambers 218 into which the vessel is divided by partitions 217 (Figs. 11, 12). Within the housing 200 are a plurality of spaced concentric cylinders 201, 202, 203, and 204 spaced by radial ribs 205 (Fig. 11). These cylinders are all attached to and closed at their inner end by an integral annulus 206 operatively connected to a section 207 of a rotor hub 209 located in the center of the vessel. At its outer end each of the concentric cylinders 201 to 204 is provided with an outwardly extending flange portion 208 extending to the inner wall of the enclosing cylindrical housing 200 where it has a rectangular flange portion 210 bearing against the inner surface of the cylindrical casing, thus forming a plurality of concentric annular passages 221 to 224 leading toward the compartments 218. As shown in Fig. 11 the annular base 206 interconnecting the concentric cylinders 201 to 204 is provided with a series of radially and circumferentially spaced ports 241, 242, 243 and 244 so that the various fluids may pass from the annular passages 221—224 into the chambers 218 of the vessel 210 when the moving ports 241—244 register with the stationary ports 231—234 respectively in the plate 216 overlying the various chambers. Interposed between plate 216 of the vessel and the annulus 206 are a plurality of removable annular inserts 250 (Fig. 13) to take up the wear as the concentric cylinders 201—204 rotate within the housing 200 and turn on the end upper and lower plates 215, 216 of the vessel 210. These annular members are formed with ports 251 registered with each port 241—244 in the annulus 206. The construction described is duplicated on the lower side of the vessel so as to provide for the discharge of the various fluids from the several chambers 218 of the vessel. Upon rotation of the hub 209 the several concentric cylinders 201—204 function in effect as the core of a multiple plug valve placing each chamber of the vessel in communication with the supply and discharge lines for the various fluids in sequence.

The laterally extending flange 208 for the innermost cylindrical member 204 is formed with an opening 252 through which steam supplied to the annular chamber 224 may pass into the space 253 between the end of the cylinder 204 and the top 254 of the cylindrical housing 200. A pipe 255 leading from the space 253 through the space 256 between the cylinder 204 and the hub section 207 communicates at its other end with the space 257 between the hub 208 and the inner wall 214 of the annular vessel. Steam from the pipe connection 228 thus passes through the opening 252 into the chamber 253 and by way of the pipe 255 to the space 257 forming a steam seal. From the space 257 steam flows through a pipe 255A and eventually reaches the discharge connection 228A.

In the reactor of Fig. 14 the end wall 315 of vessel 310 is provided with a flanged neck portion 301 which with an extension 302 of the inner wall 314 of the vessel forms an annular space communicating with the various compartments 318 of the vessel. The inner wall 314 of the annular vessel 310 is extended to the height of the flange 303 and is provided with a flange 304 extending laterally and outwardly towards the latter. A manifold casting 305 resting on the neck flanges 303, 304 of the vessel is provided with a box-like fluid manifold conduit 321 spaced from its outer wall to leave a passage 335 and located beneath a flange 306 extending outwardly from the upper edge of the inner wall of the casting 305. The bottom wall of the conduit 321 and the flange 304 extending outwardly from the extension 302 of wall 314 are formed with registering ports 331, 341 opposite each chamber 318 through which fluid supplied to the conduit from the pipe connection 325 may pass when these ports are not obscured by imperforate portions of a rotatable annulus 350 that is provided with openings 352 (Fig. 15) for placing these ports in communication.

The inner wall of the manifold casting 305 extends upwardly from conduit 321 and, as mentioned, has an outwardly extending flange 306 terminating short of the outer wall of the casting and resembling the flange 304 on the extension 302 of the inner wall 314 of the vessel 310. Above the manifold casting 305 is another manifold casting 307 of generally similar construction and the flow of fluid from the conduit portion 331 of the latter into the passage 335 leading to a compartment 318 of the vessel 310 is likewise controlled by a rotary annulus 351 having openings to register with ports 332, 342 in the flange 306 and bottom of conduit 331 for permitting fluid flow from the conduit to a chamber 318. The manifold 307 is of generally domelike construction having its conduit section 331 spaced from the inner wall of the top of the dome, this wall also being provided with a port 333 for each compartment. The uppermost manifold casting 308 is annular and rests on the dome 307. The bottom wall is formed with ports 343 registering with the openings 333 in the dome 307 and controlled by the annular member 353. The annular valve members 350, 351 and 353 are supported by radial arms 355 from hubs 356 fixed to the shaft 357 which may be rotated in the same manner as for the other forms of the invention to control the flow of various fluids from the manifolds to the various chambers of the reactor.

In Fig. 16 there is shown a preferred construction for the annular valve members 350, etc. Two thin steel annuli 360, 361 are mounted in suitable cutout portions or circumferential grooves in the top and bottom faces of a somewhat larger annular member 362. The latter is formed with a plurality of perforations 363 extending from the inner faces of the annuli 360, 361 to a chamber 364 so that steam admitted to the latter through the pipe connection 365 acts on the annuli to maintain good sealing contact between the latter and the underside of the wall of the manifold conduit 321 or the ported flange 304.

The valve construction shown in Fig. 17 utilizes two annular members 366, 367 with an intervening bellows 368 to which steam is supplied through a pipe 365 for maintaining the annuli against the underside of the manifold conduit 331 and the ported flange 306.

What we claim is:

1. Apparatus of the type described comprising means forming a plurality of separate fluid-tight chambers spaced circumferentially about an axis located centrally among them; a plurality of fluid supply manifolds disposed adjacent said chambers; means forming inlet ports for each of said chambers corresponding to each manifold; offtake manifolds and means forming corresponding outlet ports so located that the fluids from each supply manifold flow through a chamber in passing to the related offtake manifold; valve means controlling said inlet and outlet ports arranged to place one set of inlet and outlet manifolds in communication with some of said chambers for passing one fluid therethrough and another set of inlet and outlet manifolds in communication with other chambers to pass another fluid therethrough while simultaneously cutting off other manifolds from communication with these chambers to exclude flow of other fluids therethrough; and means rotatable about the said axis located centrally among said chambers for cyclically operating said valve means so as to place each chamber in communication sequentially with the manifolds for the several fluids.

2. Apparatus of the type described comprising a closed vessel divided internally by fluid tight partitions into a plurality of separate chambers spaced circumferentially about the axis of said vessel; a plurality of fluid supply manifolds disposed adjacent said vessel; an inlet connection from each manifold to each of said chambers; corresponding outlet connections and offtake manifolds so located that the fluids supplied by each manifold flow through a chamber in passing to an offtake manifold; individual valves for each inlet and outlet connection having members operable to open and close said valves, the operating members for valves controlling the flow of the several fluids being located in separate concentric paths about the axis of said vessel; and means rotatable about the axis of said chamber having members disposed in radially and circumferentially spaced relation on said arms for engagement with said operating members to open the inlet and outlet valves in connections from one set of manifolds for passing the related fluid through one of said chambers while simultaneously positioning other inlet and outlet valves to exclude flow of the related fluid through said chamber.

3. Apparatus of the type described comprising a closed vessel divided internally by radially extending partitions into a plurality of separate fluid-tight chambers spaced circumferentially about the axis of said vessel; a plurality of fluid supply manifolds disposed adjacent said vessel; an inlet connection from each manifold to each of said chambers; corresponding outlet connections and offtake manifolds so located that the fluids from each supply manifold pass through a chamber in flowing to an offtake manifold; individual valves for each inlet and outlet connection having operating members for opening and closing said valves, the operating members for valves controlling the flow of the several fluids being located in alignment in separate movement paths; and separate means for traversing each of the respective movement paths to engage said operating members in the respective paths to open the inlet and outlet valves in connections from one manifold for passing one fluid through some of said chambers and open inlet and outlet valves in connections from another manifold for passing another fluid through other chambers while simultaneously closing other inlet and outlet valves for these chambers to exclude flow of other fluids therethrough.

4. Apparatus of the type described comprising means forming a plurality of separate fluid tight chambers spaced circumferentially about an axis located centrally among them; a plurality of fluid supply manifolds adjacent said chambers; an inlet connection from each manifold to each of said chambers; corresponding outlet connections and offtake manifolds so located that the fluids from each supply manifold contact pass through a chamber in flowing to an offtake manifold; individual rotary valves for each inlet and outlet connection having spindles provided with cross-arms adapted to be operated to open and close said valves, the cross-arms for the valves controlling the flow of the several fluids being located in separate concentric paths; rotatable means provided with members disposed in radially and circumferentially spaced relation for engagement with said cross-arms to operate the inlet and outlet valves in connections from one manifold for passing one fluid through some of said chambers and operate the inlet and outlet valves in connections from another manifold for passing another fluid through other chambers while simultaneously positioning other inlet and outlet valves to exclude flow of other fluids through these chambers; and means for rotating said member.

5. Apparatus of the type described comprising a closed vessel divided internally by radially extending partitions into a plurality of separate fluid tight chambers spaced circumferentially about the axis of said vessel; a plurality of fluid supply manifolds disposed adjacent said vessel; an inlet connection from each manifold to each of said chambers; corresponding outlet connections and offtake manifolds so located that the fluids from each supply manifold pass through a chamber in flowing to an offtake manifold; individual rotary valves for each inlet and outlet connection having spindles provided with cross-arms adapted to be operated to open and close said valves, the cross-arms for the valves controlling the flow of the several fluids being located in separate concentric paths about the axis of said vessel; and means rotatable about the axis of said vessel provided with members disposed in radially and circumferentially spaced relation for engagement with said cross-arms to operate the inlet and outlet valves in connections from one manifold for passing one fluid through some of said chambers and operate the inlet and outlet valves in connections from another manifold for passing another fluid through other chambers while simultaneously positioning other inlet and outlet valves to exclude flow of other fluids through these chambers.

6. Apparatus of the type described comprising a closed vessel divided internally by radially extending partitions into a plurality of separate fluid tight chambers spaced circumferentially about the axis of said vessel; a plurality of fluid supply manifolds disposed adjacent said vessel; an inlet connection from each manifold to each of said chambers; corresponding outlet connections and offtake manifolds so located that the fluids from each supply manifold pass through a chamber in flowing to an offtake manifold; individual rotary valves for each inlet and outlet connection having spindles provided with cross-arms adapted to be operated to open and close said valves, the cross-arms for the valves controlling the flow of the several fluids being located in separate concentric paths about the axis of said vessel; a reel rotatable about the axis of said vessel having radial arms provided with removable studs engageable with said cross-arms and disposed in radially and circumferentially spaced relation on said arms to operate the inlet and outlet valves in connections from one manifold for passing one fluid through some of said chambers and operate the inlet and outlet valves in connections from another manifold for passing another fluid through other chambers while simultaneously positioning other inlet and outlet valves to exclude flow of other fluids through these chambers; and means for rotating said reel.

7. Apparatus of the type described comprising means forming a plurality of separate fluid-tight chambers spaced circumferentially about an axis located centrally among them; a plurality of fluid supply manifolds disposed adjacent said chambers; means forming inlet ports for each of said chambers corresponding to each manifold; offtake manifolds and means forming corresponding outlet ports so located that the fluids from each supply manifold pass through a chamber in flowing to the related offtake manifold; individual valves for each inlet and outlet connection having operating members adapted to be actuated to open and close said valves, the operating members for the valves controlling the flow of the several fluids being located in alignment in separate paths of movement spaced about an axis located centrally among said chambers; cam means rotatable about said axis engageable with said valve operating members to open inlet and outlet valves in connections from one manifold for passing one fluid through some of said chambers and opening the inlet and outlet valves in connections from another manifold for passing another fluid through other chambers while simultaneously closing the other inlet and outlet valves for these chambers to exclude flow of other fluids therethrough; and means for rotating said cam means to cyclically operate said valve means so as to place each chamber in communication sequentially with the manifolds for the several fluids.

8. Apparatus of the type described comprising means forming a plurality of separate fluid-tight chambers spaced circumferentially about an axis located centrally among them; a plurality of fluid supply manifolds disposed adjacent said chambers; means forming inlet ports for each of said chambers corresponding to each manifold; offtake manifolds and means forming corresponding outlet ports so located that the fluids from each supply manifold pass through a chamber in flowing to the related offtake manifold; individual valves for each inlet and outlet connection having operating members adapted to be actuated to open and close said valves, the operating members for the valves controlling the flow of the several fluids being located in alignment in separate concentric paths of movement spaced about an axis located centrally among said chambers; cam means rotatable about said axis having contour surfaces engageable with valve operating members and disposed in radially and circumferentially spaced relation to open inlet and outlet valves in connections from one manifold for passing one fluid through some of said chambers and opening the inlet and outlet valves in connections from another manifold for passing another fluid through other chambers while simultaneously closing the inlet and outlet valves for these chambers to exclude flow of other fluids therethrough; and means for rotating said cam means to cyclically operate said valve means so as to place each chamber in communication sequentially with the manifolds for the several fluids.

9. Apparatus of the type described comprising a closed vessel divided internally by radially extending partitions into a plurality of separate fluid tight chambers spaced circumferentially about the axis of said vessel; a plurality of fluid supply manifolds disposed adjacent said vessel; an inlet connection from each manifold to each of said chambers; corresponding outlet connections and offtake manifolds so located that the fluids from each supply manifold pass through a chamber in flowing to an offtake manifold; individual valves for each inlet and outlet connection having operating members adapted to be actuated to open and close said valves, the operating members for the valves controlling the flow of the several fluids being located in alignment in separate concentric paths of movement spaced about the axis of said vessel; cam means rotatable about said axis having contour surfaces engageable with valve operating members and disposed in radially and circumferentially spaced relation to open inlet and outlet valves in connections from one manifold for passing one fluid through some of said chambers and opening the inlet and outlet valves in connections from another manifold for passing another fluid through other chambers while simultaneously closing the other inlet and outlet valves for these chambers to exclude flow of other fluids therethrough; and means for rotating said cam means to cyclically operate said valve means so as to place each chamber in communication sequentially with the manifolds for the several fluids.

10. Apparatus of the type described comprising a closed vessel divided internally by radially extending partitions into a plurality of separate fluid tight chambers spaced circumferentially about the axis of said vessel; a plurality of fluid supply manifolds disposed adjacent said vessel; an inlet connection from each manifold to each of said chambers; corresponding outlet connections and offtake manifolds so located that the fluids from each supply manifold pass through a chamber in flowing to an offtake manifold; individual valves for each inlet and outlet connection having operating members extending toward the axis of said vessel and adapted to be actuated to open and close said valves, the operating members for the valves controlling the flow of the several fluids being located in separate paths of movement spaced about the axis of said vessel; cam means rotatable about said axis having contour elements engageable with said valve operating members to open inlet and outlet valves in connections from one manifold for passing one fluid through some of said chambers and opening the inlet and outlet valves in connections from another manifold for passing another fluid through other chambers while simultaneously closing the other inlet and outlet valves for these chambers to exclude flow of other fluids therethrough; and means for rotating said cam means to cyclically operate said valve means so as to place each chamber in communication sequentially with the manifolds for the several fluids.

WILLIAM D. YERRICK.
SVEN HOLM.
ARTHUR JENSEN.